United States Patent
Na et al.

(10) Patent No.: US 9,266,981 B2
(45) Date of Patent: Feb. 23, 2016

(54) CONJUGATED DIENE RANDOM COPOLYMER HAVING ALKOXYSILANE UNIT

(71) Applicant: KOREA KUMHO PETROCHEMICAL CO., LTD, Seoul (KR)

(72) Inventors: Dong Hyuk Na, Daejeon (KR); Gwanghoon Kwag, Deajeon (KR); Hanjoung Cho, Daejeon (KR); Jun Keol Choi, Deajeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 14/335,078

(22) Filed: Jul. 18, 2014

(65) Prior Publication Data

US 2015/0065639 A1 Mar. 5, 2015

(30) Foreign Application Priority Data

Aug. 27, 2013 (KR) ........................ 10-2013-0101517

(51) Int. Cl.
| | | |
|---|---|---|
| *C08F 30/00* | (2006.01) | |
| *C08F 236/00* | (2006.01) | |
| *C08F 30/08* | (2006.01) | |
| *C08K 3/04* | (2006.01) | |
| *C08L 43/04* | (2006.01) | |
| *C08K 3/36* | (2006.01) | |
| *B60C 1/00* | (2006.01) | |
| *C08F 236/06* | (2006.01) | |
| *C08F 236/10* | (2006.01) | |

(52) U.S. Cl.
CPC . *C08F 30/08* (2013.01); *B60C 1/00* (2013.01); *B60C 1/0016* (2013.04); *C08K 3/04* (2013.01); *C08K 3/36* (2013.01); *C08L 43/04* (2013.01); *C08F 236/06* (2013.01); *C08F 236/10* (2013.01)

(58) Field of Classification Search
CPC ........ C08F 30/08; C08F 36/04; C08F 236/00; C08F 236/06; C08F 236/10; C08F 2230/085

USPC ......................................... 526/279, 319, 340
See application file for complete search history.

(56) References Cited

U.S. PATENT DOCUMENTS

| | | | |
|---|---|---|---|
| 3,563,946 A | 2/1971 | Miller et al. | |
| 3,575,913 A | 4/1971 | Meier | |
| 4,064,081 A | 12/1977 | McCoy et al. | |
| 5,274,027 A | 12/1993 | Guillaume et al. | |
| 5,302,655 A | 4/1994 | Guillaume et al. | |
| 5,508,333 A | 4/1996 | Shimizu | |
| 6,008,295 A * | 12/1999 | Takeichi | B60C 1/0016 524/423 |
| 6,133,388 A | 10/2000 | Lee et al. | |
| 6,699,935 B2 * | 3/2004 | Akema et al. | 525/191 |
| 6,992,147 B1 * | 1/2006 | Ozawa | C08C 19/44 525/105 |
| 7,741,399 B2 * | 6/2010 | Mamiya | B60C 1/0016 524/495 |
| 8,476,375 B2 * | 7/2013 | Backer | C08F 255/00 522/114 |
| 9,132,697 B2 * | 9/2015 | Kondo | B60C 1/0016 |
| 2010/0152369 A1 | 6/2010 | Shibata et al. | |
| 2010/0189975 A1 * | 7/2010 | Kakuno | B32B 5/14 428/213 |
| 2011/0207879 A1 | 8/2011 | Ito et al. | |

FOREIGN PATENT DOCUMENTS

| | | | | |
|---|---|---|---|---|
| JP | 62-201910 A | * | 9/1962 | ............ C08F 112/14 |
| JP | 05-339543 A | * | 12/1993 | ........... C09D 210/10 |
| JP | 2002-020543 | | 1/2002 | |
| JP | 2002-145965 | | 5/2002 | |

* cited by examiner

*Primary Examiner* — Rip A Lee
(74) *Attorney, Agent, or Firm* — Whitham, Curtis, Christofferson & Cook, P.C.

(57) ABSTRACT

Disclosed is a conjugated diene random copolymer having an alkoxysilane unit, which is prepared by subjecting a conjugated diene monomer, an aromatic vinyl monomer and an alkoxysilane monomer having a specific structure to emulsion polymerization, and in which the copolymer contains an alkoxysilane unit in the backbone thereof and is thus enhanced in the degree of dispersion and affinity to an inorganic reinforcing material such as carbon black or silica, and is useful as a rubber material for tires having superior mechanical and dynamic properties.

8 Claims, 9 Drawing Sheets

CONJUGATED DIENE RANDOM COPOLYMER HAVING ALKOXYSILANE UNIT

CROSS-REFERENCE TO RELATED APPLICATIONS

This application claims priority under 35 U.S.C. §119 to Korean Patent Application No. 10-2013-0101517, filed on Aug. 27, 2013, in the Korean Intellectual Property Office, the disclosure of which is incorporated herein by reference in its entirety.

BACKGROUND OF THE INVENTION

1. Field of the Invention

The present invention relates to a conjugated diene random copolymer having an alkoxysilane unit. More particularly, the present invention relates to a conjugated diene random copolymer which is prepared by subjecting a conjugated diene monomer, an aromatic vinyl monomer and an alkoxysilane monomer having a specific structure to emulsion polymerization, wherein the copolymer contains an alkoxysilane unit in the backbone thereof and is thus enhanced in the degree of dispersion and affinity to a reinforcing material such as carbon black or silica, and is useful as a rubber material for tires having superior mechanical and dynamic properties.

2. Description of the Related Art

With the recent increasing interest in development of eco-friendly and energy-saving tires having high functionality, thorough research is ongoing to develop highly functional rubber adapted therefor. In order to develop tires having high functionality, it is essential to develop rubber which satisfies dynamic properties including high wet traction and low rolling resistance, which may directly affect fuel efficiency.

Typical tire rubber includes conjugated diene polymers such as styrene-butadiene rubber (hereinafter referred to as "SBR") or butadiene rubber (hereinafter referred to as "BR"), which may be prepared using solution polymerization or emulsion polymerization.

In solution polymerization (SSBR), rubber is typically prepared in the presence of an organic solvent using organic lithium as an initiator. Upon rubber preparation using solution polymerization, it is possible to adjust the micro molecular structure, including the vinyl structure of conjugated diene, the block ratio of styrene molecule, etc., and also it is easy to modify the physical properties of polymers using a functional to initiator or a terminal modifier. Accordingly, conjugated diene polymers having a silane functional group introduced to the terminal thereof are mainly synthesized using solution polymerization [U.S. Pat. Nos. 5,508,333 and 6,133,388, and US Patent Application Nos. 2010-0152369 and 2011-0207879]

In emulsion polymerization (ESBR), rubber is typically prepared using a radical polymerization initiator. Upon rubber preparation using emulsion polymerization, it is not easy to adjust the molecular structure and also it is difficult to modify physical properties of the polymer by the introduction of the functional group.

Conventional techniques for synthesizing conjugated diene-based polymers having enhanced compatibility with inorganic materials such as carbon black or silica using emulsion polymerization are as follows.

U.S. Pat. Nos. 3,575,913 and 3,563,946 disclose techniques for preparing styrene-butadiene or styrene-butadiene-acrylate copolymers by emulsion polymerization using potassium persulfate or azobisisobutyronitrile as a radical polymerization initiator.

U.S. Pat. No. 4,064,081 discloses a technique for preparing a butadiene-styrene-itaconic acid copolymer by emulsion polymerization using potassium persulfate as a radical polymerization initiator.

U.S. Pat. Nos. 5,274,027 and 5,302,655 disclose techniques for preparing styrene-butadiene-acrylate copolymers by emulsion polymerization of acrylate-based monomers such as methyl methacrylic acid and itaconic acid using ammonium persulate as a radical polymerization initiator.

As mentioned above, adjusting the molecular structure of the conjugated diene polymers resulting from emulsion polymerization is not easy, thus making it difficult to control the properties of polymers by the use of the functional monomers. For this reason, almost no attempts have been made to prepare conjugated diene random copolymers from alkoxysilane-substituted monomers.

SUMMARY OF THE INVENTION

Culminating in the present invention, intensive and thorough research into preparation of conjugated diene polymers having high affinity to reinforcing materials such as carbon black or silica using emulsion polymerization, resulted in the finding that emulsion polymerization may be performed with additional use of an alkoxysilane derivative having a specific structure as a monomer for preparation of a conjugated diene polymer, yielding a conjugated diene random copolymer having an alkoxysilane unit.

Accordingly, an object of the present invention is to provide a conjugated diene random copolymer having an alkoxysilane unit of a specific structure.

Also, another object of the present invention is to provide a polymer composition including the conjugated diene random copolymer as above and a reinforcing agent.

Also, still another object of the present invention is to provide a tire having superior properties in terms of wet resistance, rolling resistance and fuel efficiency, formed from the polymer composition as above.

Also, yet another object of the present invention is to provide shoes or belts, manufactured using the polymer composition as above.

In order to accomplish the above objects, the present invention provides a conjugated diene random copolymer having an alkoxysilane unit, which is prepared by subjecting a conjugated diene monomer, an aromatic vinyl monomer, and at least one alkoxysilane monomer represented by Formula 1 or 2 below to emulsion polymerization:

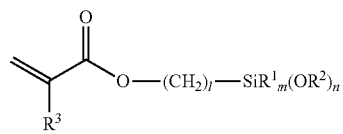
[Formula 1]

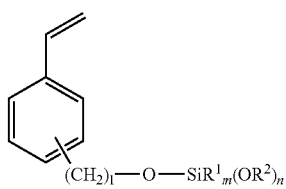
[Formula 2]

in Formula 1 or 2, $R^1$ and $R^2$ are identical to or different from each other and are a $C_1$-$C_{10}$ alkyl group, $R^3$ is a hydrogen atom or a methyl group, l is an integer of 0~30, and n is an integer of 1~3, with a proviso that m+n=3.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF SPECIFIC EMBODIMENTS

Figure 1A:
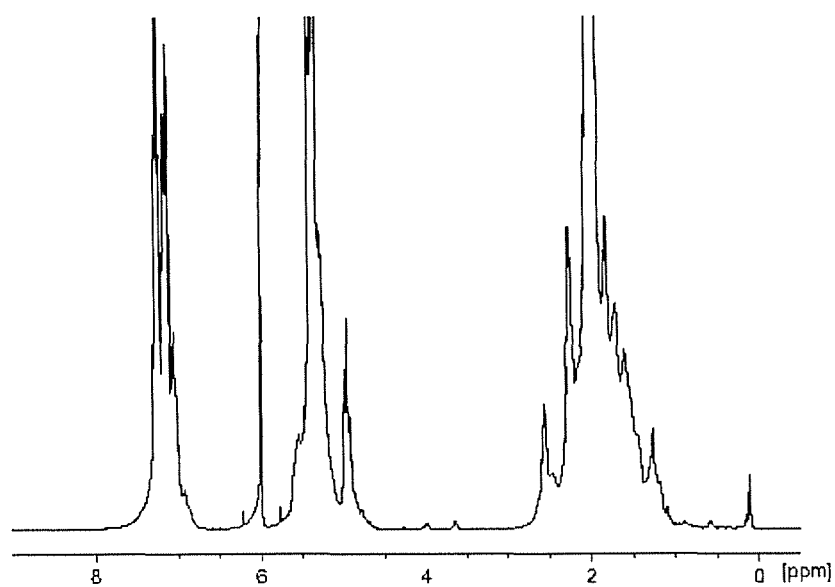
FIG. 1A illustrates $^1$H NMR spectrum of a conjugated diene random copolymer of Example 1.

According to the present invention, a conjugated diene random copolymer having an alkoxysilane unit is prepared by subjecting a conjugated diene monomer, an aromatic vinyl monomer, and at least one alkoxysilane monomer represented by Formula 1 or 2 below to emulsion polymerization:

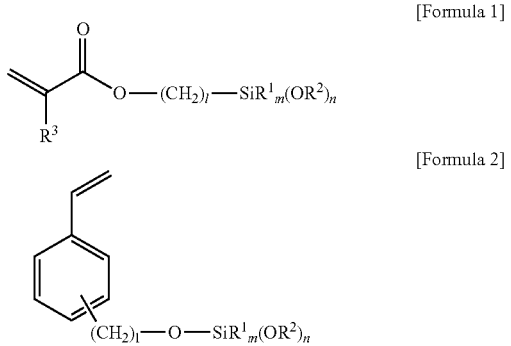

[Formula 1]

[Formula 2]

in Formula 1 or 2, $R^1$ and $R^2$ are identical to or different from each other and are a $C_1$-$C_{10}$ alkyl group, $R^3$ is a hydrogen atom or a methyl group, l is an integer of 0~30, and n is an integer of 1~3, with a proviso that m+n=3.

In the alkoxysilane monomer represented by Formula 1 or 2, $R^1$ and $R^2$ each are preferably a methyl group, an ethyl group, an n-propyl group, an isopropyl group, an n-butyl group, an s-butyl group, a tert-butyl group, an n-pentyl group, an n-pentyl group, or an n-hexyl group. More preferably, $R^1$ and $R^2$ each are a methyl group, an ethyl group, an n-propyl group, an isopropyl group, an n-butyl group, an s-butyl group, or a tert-butyl group. Much more preferably, $R^1$ and $R^2$ each are a methyl group, an ethyl group, or an n-propyl group.

Also, l is preferably an integer of 0~10, more preferably an integer of 0~9, and much more preferably an integer of 0~5.

The alkoxysilane monomer represented by Formula 1 or 2 according to the present invention is specifically exemplified as follows.

Examples of the alkoxysilane monomer represented by Formula 1 wherein $R^3$ is a hydrogen atom may include (trimethoxysilyl)methyl acrylate, is (dimethoxymethylsilyl)methyl acrylate, (dimethoxyethylsilyl)methyl acrylate, (dimethoxypropylsilyl)methyl acrylate, (methoxydimethylsilyl)methyl acrylate, (methoxymethylethylsilyl)methyl acrylate, (methoxymethylpropylsilyl)methyl acrylate, (methoxyethylpropylsilyl)methyl acrylate, (methoxydiethylsilyl) methyl acrylate, (methoxydipropylsilyl)methyl acrylate, (triethoxysilyl)methyl acrylate, (diethoxymethylsilyl)methyl acrylate, (diethoxyethylsilyl)methyl acrylate, (diethoxypropylsilyl)methyl acrylate, (ethoxydimethylsilyl)methyl acrylate, (ethoxymethylethylsilyl)methyl acrylate, (ethoxymethylpropylsilyl)methyl acrylate, (ethoxyethylpropylsilyl) methyl acrylate, (ethoxydiethylsilyl)methyl acrylate, (ethoxydipropylsilyl)methyl acrylate, (trimethoxysilyl)ethyl acrylate, (dimethoxymethylsilyl)ethyl acrylate, (dimethoxyethylsilyl)ethyl acrylate, (dimethoxypropylsilyl)ethyl acrylate, (methoxydimethylsilyl)ethyl acrylate, (methoxymethylethylsilyl)ethyl acrylate, (methoxymethylpropylsilyl)ethyl acrylate, (methoxyethylpropylsilyl)ethyl acrylate, (methoxydiethylsilyl)ethyl acrylate, (methoxydipropylsilyl)ethyl acrylate, (triethoxysilyl)ethyl acrylate, (diethoxymethylsilyl) ethyl acrylate, (diethoxyethylsilyl)ethyl acrylate, (diethoxypropylsilyl)ethyl acrylate, (ethoxydimethylsilyl) ethyl acrylate, (ethoxymethylethylsilyl)ethyl acrylate, (ethoxymethylpropylsilyl)ethyl acrylate, (ethoxyethylpropylsilyl)ethyl acrylate, (ethoxydiethylsilyl)ethyl acrylate, (ethoxydipropylsilyl)ethyl acrylate, (trimethoxysilyl)propyl acrylate, (dimethoxymethylsilyl)propyl acrylate, (dimethoxyethylsilyl)propyl acrylate, (dimethoxypropylsilyl)propyl acrylate, (methoxydimethylsilyl)propyl acrylate, (methoxymethylethylsilyl)propyl acrylate, (methoxymethylpropylsilyl)propyl acrylate, (methoxyethylpropylsilyl)propyl acrylate, (methoxydiethylsilyl)propyl acrylate, (methoxydipropylsilyl)propyl acrylate, (triethoxysilyl)propyl acrylate, (diethoxymethylsilyl)propyl acrylate, (diethoxyethylsilyl)propyl acrylate, (diethoxypropylsilyl)propyl acrylate, (ethoxydimethylsilyl)propyl acrylate, (ethoxymethylethylsilyl)propyl acrylate, (ethoxymethylpropylsilyl)propyl acrylate, (ethoxyethylpropylsilyl)propyl acrylate, (ethoxydiethylsilyl)propyl acrylate, (ethoxydipropylsilyl)propyl acrylate, (trimethoxysilyl)butyl acrylate, (dimethoxymethylsilyl)butyl acrylate, (dimethoxyethylsilyl)butyl acrylate, (dimethoxypropylsilyl)butyl acrylate, (methoxydimethylsilyl)butyl acrylate, (methoxymethylethylsilyl)butyl acrylate, (methoxymethylpropylsilyl)butyl acrylate, (methoxyethylpropylsilyl)butyl acrylate, (methoxydiethylsilyl)butyl acrylate, (methoxydipropylsilyl)butyl acrylate, (triethoxysilyl)butyl acrylate, (diethoxymethylsilyl)butyl acrylate, (diethoxyethylsilyl)butyl acrylate, (diethoxypropylsilyl)butyl acrylate, (ethoxydimethylsilyl)butyl acrylate, (ethoxymethylethylsilyl)butyl acrylate, (ethoxymethylpropylsilyl)butyl acrylate, (ethoxyethylpropylsilyl)butyl acrylate, (ethoxydiethylsilyl) butyl acrylate, (ethoxydipropylsilyl)butyl acrylate, (trimethoxysilyl)pentyl acrylate, (dimethoxymethylsilyl)pentyl acrylate, (dimethoxyethylsilyl)pentyl acrylate, (dimethoxypropylsilyl)pentyl acrylate, (methoxydimethylsilyl)pentyl acrylate, (methoxymethylethylsilyl)pentyl acrylate, (methoxymethylpropylsilyl)pentyl acrylate, (methoxyethylpropylsilyl)pentyl acrylate, (methoxydiethylsilyl)pentyl acrylate, (methoxydipropylsilyl)pentyl acrylate, (triethoxysilyl)pentyl acrylate, (diethoxymethylsilyl)pentyl acrylate, (diethoxyethylsilyl)pentyl acrylate, (diethoxypropylsilyl)pentyl acrylate, (ethoxydimethylsilyl)pentyl acrylate, (ethoxymethylethylsilyl)pentyl acrylate, (ethoxymethylpropylsilyl)pentyl acrylate, (ethoxyethylpropylsilyl)pentyl acrylate, (ethoxydiethylsilyl)pentyl acrylate, (ethoxydipropylsilyl)pentyl acrylate, etc.

Also, examples of the alkoxysilane monomer represented by Formula 1 wherein $R^3$ is a methyl group may include (trimethoxysilyl)methyl methacrylate, (dimethoxymethylsilyl)methyl methacrylate, (dimethoxyethylsilyl)methyl methacrylate, (dimethoxypropylsilyl)methyl methacrylate, (methoxydimethylsilyl)methyl methacrylate, (methoxymethylethylsilyl)methyl methacrylate, (methoxymethylpropylsilyl)methyl methacrylate, (methoxyethylpropylsilyl)methyl methacrylate, (methoxydiethylsilyl)methyl methacrylate, (methoxydipropylsilyl)methyl methacrylate, (triethoxysilyl)methyl methacrylate, (diethoxymethylsilyl)methyl methacrylate, (diethoxyethylsilyl)methyl methacrylate, (diethoxypropylsilyl)methyl methacrylate, (ethoxydimethylsilyl)methyl methacrylate, (ethoxymethylethylsilyl)methyl methacrylate, (ethoxymethylpropylsilyl)methyl methacrylate, (ethoxyethylpropylsilyl)methyl methacrylate, (ethoxydiethylsilyl)methyl methacrylate, (ethoxydipropylsilyl)methyl methacrylate, (trimethoxysilyl)ethyl methacrylate, (dimethoxymethylsilyl)ethyl methacrylate, (dimethoxyethylsilyl)ethyl methacrylate, (dimethoxypropylsilyl)ethyl methacrylate, (methoxydimethylsilyl)ethyl methacrylate, (methoxymethylethylsilyl)ethyl methacrylate, (methoxymethylpropylsilyl)ethyl methacrylate, (methoxyethylpropylsilyl)ethyl methacrylate, (methoxydiethylsilyl)ethyl methacrylate, (methoxydipropylsilyl)ethyl methacrylate, (triethoxysilyl)ethyl methacrylate, (diethoxymethylsilyl)ethyl methacrylate, (diethoxyethylsilyl)ethyl methacrylate, (diethoxypropylsilyl)ethyl methacrylate, (ethoxydimethylsilyl)ethyl methacrylate, (ethoxymethylethylsilyl)ethyl methacrylate, (ethoxymethylpropylsilyl)ethyl methacrylate, (ethoxyethylpropylsilyl)ethyl methacrylate, (ethoxydiethylsilyl)ethyl methacrylate, (ethoxydipropylsilyl)ethyl methacrylate, (trimethoxysilyl)propyl methacrylate, (dimethoxymethylsilyl)propyl methacrylate, (dimethoxyethylsilyl)propyl methacrylate, (dimethoxypropylsilyl)propyl methacrylate, (methoxydimethylsilyl)propyl methacrylate, (methoxymethylethylsilyl)propyl methacrylate, (methoxymethylpropylsilyl)propyl methacrylate, (methoxyethylpropylsilyl)propyl methacrylate, (methoxydiethylsilyl)propyl methacrylate, (methoxydipropylsilyl)propyl methacrylate, (triethoxysilyl)propyl methacrylate, (diethoxymethylsilyl)propyl methacrylate, (diethoxyethylsilyl)propyl methacrylate, (diethoxypropylsilyl)propyl methacrylate, (ethoxydimethylsilyl)propyl methacrylate, (ethoxymethylethylsilyl)propyl methacrylate, (ethoxymethylpropylsilyl)propyl methacrylate, (ethoxyethylpropylsilyl)propyl methacrylate, (ethoxydiethylsilyl)propyl methacrylate, (ethoxydipropylsilyl)propyl methacrylate, (trimethoxysilyl)butyl methacrylate, (dimethoxymethylsilyl)butyl methacrylate, (dimethoxyethylsilyl)butyl methacrylate, (dimethoxypropylsilyl)butyl methacrylate, (methoxydimethylsilyl)butyl methacrylate, (methoxymethylethylsilyl)butyl methacrylate, (methoxymethylpropylsilyl)butyl methacrylate, (methoxyethylpropylsilyl)butyl methacrylate, (methoxydiethylsilyl)butyl methacrylate, (methoxydipropylsilyl)butyl methacrylate, (triethoxysilyl)butyl methacrylate, (diethoxymethylsilyl)butyl methacrylate, (diethoxyethylsilyl)butyl methacrylate, (diethoxypropylsilyl)butyl methacrylate, (ethoxydimethylsilyl)butyl methacrylate, (ethoxymethylethylsilyl)butyl methacrylate, (ethoxymethylpropylsilyl)butyl methacrylate, (ethoxyethylpropylsilyl)butyl methacrylate, (ethoxydiethylsilyl)butyl methacrylate, (ethoxydipropylsilyl)butyl methacrylate, (trimethoxysilyl)pentyl methacrylate, (dimethoxymethylsilyl)pentyl methacrylate, (dimethoxyethylsilyl)pentyl methacrylate, (dimethoxypropylsilyl)pentyl methacrylate, (methoxydimethylsilyl)pentyl methacrylate, (methoxymethylethylsilyl)pentyl methacrylate, (methoxymethylpropylsilyl)pentyl methacrylate, (methoxyethylpropylsilyl)pentyl methacrylate, (methoxydiethylsilyl)pentyl methacrylate, (methoxydipropylsilyl)pentyl methacrylate, (triethoxysilyl)pentyl methacrylate, (diethoxymethylsilyl)pentyl methacrylate, (diethoxyethylsilyl)pentyl methacrylate, (diethoxypropylsilyl)pentyl methacrylate, (ethoxydimethylsilyl)pentyl methacrylate, (ethoxymethylethylsilyl)pentyl methacrylate, (ethoxymethylpropylsilyl)pentyl methacrylate, (ethoxyethylpropylsilyl)pentyl methacrylate, (ethoxydiethylsilyl)pentyl methacrylate, (ethoxydipropylsilyl)pentyl methacrylate, etc.

Examples of the alkoxysilane monomer represented by Formula 2 may include trimethoxy(4-vinylphenoxy)silane, dimethoxymethyl(4-vinylphenoxy)silane, dimethoxyethyl(4-vinylphenoxy)silane, dimethoxypropyl(4-vinylphenoxy)silane, methoxydimethyl(4-vinylphenoxy)silane, methoxymethylethyl(4-vinylphenoxy)silane, methoxymethylpropyl(4-vinylphenoxy)silane, methoxydiethyl(4-vinylphenoxy)silane, methoxyethylpropyl(4-vinylphenoxy)silane, methoxydipropyl(4-vinylphenoxy)silane, triethoxy(4-vinylphenoxy)silane, diethoxymethyl(4-vinylphenoxy)silane, diethoxyethyl(4-vinylphenoxy)silane, diethoxypropyl(4-vinylphenoxy)silane, ethoxydimethyl(4-vinylphenoxy)silane, ethoxymethylethyl(4-vinylphenoxy)silane, ethoxymethylpropyl(4-vinylphenoxy)silane, ethoxydiethyl(4-vinylphenoxy)silane, ethoxyethylpropyl(4-vinylphenoxy)silane, ethoxydipropyl(4-vinylphenoxy)silane, trimethoxy(4-vinylbenzyloxy)silane, dimethoxymethyl(4-vinylbenzyloxy)silane, dimethoxyethyl(4-vinylbenzyloxy)silane, dimethoxypropyl(4-vinylbenzyloxy)silane, methoxydimethyl(4-vinylbenzyloxy)silane, methoxymethylethyl(4-vinylbenzyloxy)silane, methoxymethylpropyl(4-vinylbenzyloxy)silane, methoxydiethyl(4-vinylbenzyloxy)silane, methoxyethylpropyl(4-vinylbenzyloxy)silane, methoxydipropyl(4-vinylbenzyloxy)silane, triethoxy(4-vinylbenzyloxy)silane, diethoxymethyl(4-vinylbenzyloxy)silane, diethoxyethyl(4-vinylbenzyloxy)silane, diethoxypropyl(4-vinylbenzyloxy)silane, ethoxydimethyl(4-vinylbenzyloxy)silane, ethoxymethylethyl(4-vinylbenzyloxy)silane, ethoxymethylpropyl(4-vinylbenzyloxy)silane, ethoxydiethyl(4-vinylbenzyloxy)silane, ethoxyethylpropyl(4-vinylbenzyloxy)silane, ethoxydipropyl(4-vinylbenzyloxy)silane, trimethoxy(4-vinylphenethoxy)silane, dimethoxymethyl(4-vinylphenethoxy)silane, dimethoxyethyl(4-vinylphenethoxy)silane, dimethoxypropyl(4-vinylphenethoxy)silane, methoxydimethyl(4-vinylphenethoxy)silane, methoxymethylethyl(4-vinylphenethoxy)silane, methoxymethylpropyl(4-vinylphenethoxy)silane, methoxydiethyl(4-vinylphenethoxy)silane, methoxyethylpropyl(4-vinylphenethoxy)silane, methoxydipropyl(4-vinylphenethoxy)silane, triethoxy(4-vinylphenethoxy)silane, diethoxymethyl(4-vinylphenethoxy)silane, diethoxyethyl(4-vinylphenethoxy)silane, diethoxypropyl(4-vinylphenethoxy)silane, ethoxydimethyl(4-vinylphenethoxy)silane, ethoxymethylethyl(4-vinylphenethoxy)silane, ethoxymethylpropyl(4-vinylphenethoxy)silane, ethoxydiethyl(4-vinylphenethoxy)silane, ethoxyethylpropyl(4-vinylphenethoxy)silane, ethoxydipropyl(4-vinylphenethoxy)silane, trimethoxy(4-vinylphenylpropoxy)silane, dimethoxymethyl(4-vinylphenylpropoxy)silane, dimethoxyethyl(4-vinylphenylpropoxy)silane, dimethoxypropyl(4-vinylphenylpropoxy)silane, methoxydimethyl(4-vinylphenylpropoxy)silane, methoxymethylethyl(4-vinylphenylpropoxy)silane, methoxymethylpropyl(4-vinylphenylpropoxy)silane, methoxydiethyl(4-vinylphenylpropoxy)silane, methoxyethylpropyl(4-vinylphenylpropoxy)silane, methoxydipropyl(4-vinylphenylpropoxy)silane, triethoxy(4-vinylphenylpropoxy)silane, diethoxymethyl(4-vinylphenylpropoxy)silane, diethoxyethyl(4-vinylphenylpropoxy)silane, diethoxypropyl(4-vinylphenylpropoxy)silane, ethoxydimethyl(4-vinylphenylpropoxy)silane, ethoxymethylethyl(4-vinylphenylpropoxy)silane, ethoxymethylpropyl(4-vinylphenylpropoxy)silane, ethoxydiethyl(4-vinylphenylpropoxy)silane, ethoxyethylpropyl(4-vinylphenylpropoxy)silane, ethoxydipropyl(4-vinylphenylpropoxy)silane, trimethoxy(2-vinylphenoxy)silane, dimethoxymethyl(2-vinylphenoxy)silane, dimethoxyethyl(2-vinylphenoxy)silane, dimethoxypropyl(2-vinylphenoxy)silane, methoxydimethyl(2-vinylphenoxy)silane, methoxymethylethyl(2-vinylphenoxy)silane, methoxymethylpropyl(2-vinylphenoxy)silane, methoxydiethyl(2-vinylphenoxy)silane, methoxyethylpropyl(2-vinylphenoxy)silane, methoxydipropyl(2-vinylphenoxy)silane, triethoxy(2-vinylphenoxy)silane, diethoxymethyl(2-vinylphenoxy)silane, diethoxyethyl(2-vinylphenoxy)silane, diethoxypropyl(2-vinylphenoxy)silane, ethoxydimethyl(2-vinylphenoxy)silane, ethoxymethylethyl(2-vinylphenoxy)silane, ethoxymethylpropyl(2-vinylphenoxy)silane, ethoxydiethyl(2-vinyl phenoxy)silane, ethoxyethylpropyl(2-vinylphenoxy)silane, ethoxydipropyl(2-vinylphenoxy)silane, trimethoxy(2-vinylbenzyloxy)silane, dimethoxymethyl(2-vinylbenzyloxy)silane, dimethoxyethyl(2-vinylbenzyloxy)silane, dimethoxypropyl(2-vinylbenzyloxy)silane, methoxydimethyl(2-vinylbenzyloxy)silane, methoxymethylethyl(2-vinylbenzyloxy)silane, methoxymethylpropyl(2-vinylbenzyloxy)silane, methoxydiethyl(2-vinylbenzyloxy)silane, methoxyethylpropyl(2-vinylbenzyloxy)silane, methoxydipropyl(2-vinylbenzyloxy)silane, triethoxy(2-vinylbenzyloxy)silane, diethoxymethyl(2-vinylbenzyloxy)silane, diethoxyethyl(2-vinylbenzyloxy)silane, diethoxypropyl(2-vinylbenzyloxy)silane, ethoxydimethyl(2-vinylbenzyloxy)silane, ethoxymethylethyl(2-vinylbenzyloxy)silane, ethoxymethylpropyl(2-vinylbenzyloxy)silane, ethoxydiethyl(2-vinylbenzyloxy)silane, ethoxyethylpropyl(2-vinylbenzyloxy)silane, ethoxydipropyl(2-vinylbenzyloxy)silane, trimethoxy(2-vinylphenethoxy)silane, dimethoxymethyl(2-vinylphenethoxy)silane, dimethoxyethyl(2-vinylphenethoxy)silane, dimethoxypropyl(2-vinylphenethoxy)silane, methoxydimethyl(2-vinylphenethoxy)silane, methoxymethylethyl(2-vinylphenethoxy)silane, methoxymethylpropyl(2-vinylphenethoxy)silane, methoxydiethyl(2-vinylphenethoxy)silane, methoxyethylpropyl(2-vinylphenethoxy)silane, methoxydipropyl(2-vinylphenethoxy)silane, triethoxy(2-vinylphenethoxy)silane, diethoxymethyl(2-vinyl phenethoxy)silane, diethoxyethyl(2-vinylphenethoxy)silane, diethoxypropyl(2-vinylphenethoxy)silane, ethoxydimethyl(2-vinylphenethoxy)silane, ethoxymethylethyl(2-vinylphenethoxy)silane, ethoxymethylpropyl(2-vinylphenethoxy)silane, ethoxydiethyl(2-vinylphenethoxy)silane, ethoxyethylpropyl(2-vinylphenethoxy)silane, ethoxydipropyl(2-vinylphenethoxy)silane, trimethoxy(2-vinylphenylpropoxy)silane, dimethoxymethyl(2-vinylphenylpropoxy)silane, dimethoxyethyl(2-vinylphenylpropoxy)silane, dimethoxypropyl(2-vinylphenylpropoxy)silane, methoxydimethyl(2-vinylphenylpropoxy)silane, methoxymethylethyl(2-vinylphenylpropoxy)silane, methoxymethylpropyl(2-vinylphenylpropoxy)silane, methoxydiethyl(2-vinylphenylpropoxy)silane, methoxyethylpropyl(2-vinylphenylpropoxy)silane, methoxydipropyl(2-vinylphenylpropoxy)silane, triethoxy(2-vinylphenylpropoxy)silane, diethoxymethyl(2-vinylphenylpropoxy)silane, diethoxyethyl(2-vinylphenylpropoxy)silane, diethoxypropyl(2-vinylphenylpropoxy)silane, ethoxydimethyl(2-vinylphenylpropoxy)silane, ethoxymethylethyl(2-vinylphenylpropoxy)silane, ethoxymethylpropyl(2-vinylphenylpropoxy)silane, ethoxydiethyl(2-vinylphenylpropoxy)silane, ethoxyethylpropyl(2-vinylphenylpropoxy)silane, ethoxydipropyl(2-vinylphenylpropoxy)silane, trimethoxy(3-vinylphenoxy)silane, dimethoxymethyl(3-vinylphenoxy)silane, dimethoxyethyl(3-vinylphenoxy)silane, dimethoxypropyl(3-vinylphenoxy)silane, methoxydimethyl(3-vinylphenoxy)silane, methoxymethylethyl(3-vinylphenoxy)silane, methoxymethylpropyl(3-vinylphenoxy)silane, methoxydiethyl(3-vinylphenoxy)silane, methoxyethylpropyl(3-vinylphenoxy)silane, methoxydipropyl(3-vinylphenoxy)silane, triethoxy(3-vinylphenoxy)silane, diethoxymethyl(3-vinylphenoxy)silane, diethoxyethyl(3-vinylphenoxy)silane, diethoxypropyl(3-vinylphenoxy)silane, ethoxydimethyl(3-vinylphenoxy)silane, ethoxymethylethyl(3-vinylphenoxy)silane, ethoxymethylpropyl(3-vinylphenoxy)silane, ethoxydiethyl(3-vinylphenoxy)silane, ethoxyethylpropyl(3-vinylphenoxy)silane, ethoxydipropyl(3-vinylphenoxy)silane, trimethoxy(3-vinylbenzyloxy)silane, dimethoxymethyl(3-vinyl benzyloxy)silane, dimethoxyethyl(3-vinylbenzyloxy)silane, dimethoxypropyl(3-vinylbenzyloxy)silane, methoxydimethyl(3-vinylbenzyloxy)silane, methoxymethylethyl(3-vinylbenzyloxy)silane, methoxymethylpropyl(3-vinylbenzyloxy)silane, methoxydiethyl(3-vinylbenzyloxy)silane, methoxyethylpropyl(3-vinylbenzyloxy)silane, methoxydipropyl(3-vinylbenzyloxy)silane, triethoxy(3-vinylbenzyloxy)silane, diethoxymethyl(3-vinylbenzyloxy)silane, diethoxyethyl(3-vinylbenzyloxy)silane, diethoxypropyl(3-vinylbenzyloxy)silane, ethoxydimethyl(3-vinylbenzyloxy)silane, ethoxymethylethyl(3-vinylbenzyloxy)silane, ethoxymethylpropyl(3-vinylbenzyloxy)silane, ethoxydiethyl(3-vinyl benzyloxy)silane, ethoxyethylpropyl(3-vinylbenzyloxy)silane, ethoxydipropyl(3-vinylbenzyloxy)silane, trimethoxy(3-vinylphenethoxy)silane, dimethoxymethyl(3-vinylphenethoxy)silane, dimethoxyethyl(3-vinylphenethoxy)silane, dimethoxypropyl(3-vinylphenethoxy)silane, methoxydimethyl(3-vinylphenethoxy)silane, methoxymethylethyl(3-vinylphenethoxy)silane, methoxymethylpropyl(3-vinylphenethoxy)silane, methoxydiethyl(3-vinylphenethoxy)silane, methoxyethylpropyl(3-vinylphenethoxy)silane, methoxydipropyl(3-vinylphenethoxy)silane, triethoxy(3-vinylphenethoxy)silane, diethoxymethyl(3-vinylphenethoxy)silane, diethoxyethyl(3- vinylphenethoxy)silane, diethoxypropyl(3-vinylphenethoxy)silane, ethoxydimethyl(3-vinylphenethoxy)silane, ethoxymethylethyl(3-vinylphenethoxy)silane, ethoxymethylpropyl(3-vinylphenethoxy)silane, ethoxydiethyl(3-vinylphenethoxy)silane, ethoxyethylpropyl(3-vinyl phenethoxy)silane, ethoxydipropyl(3-vinylphenethoxy)silane, trimethoxy(3-vinylphenylpropoxy)silane, dimethoxymethyl (3-vinylphenylpropoxy)silane, dimethoxyethyl(3-vinylphenylpropoxy)silane, dimethoxypropyl(3-vinylphenylpropoxy)silane, methoxydimethyl(3-vinylphenylpropoxy) silane, methoxymethylethyl(3-vinylphenylpropoxy)silane, methoxymethylpropyl(3-vinylphenylpropoxy)silane, methoxydiethyl(3-vinylphenylpropoxy)silane, methoxyethylpropyl(3-vinylphenylpropoxy)silane, methoxydipropyl(3-vinylphenylpropoxy)silane, triethoxy(3-vinylphenylpropoxy) silane, diethoxymethyl(3-vinylphenylpropoxy)silane, diethoxyethyl(3-vinylphenylpropoxy)silane, diethoxypropyl (3-vinylphenylpropoxy)silane, ethoxydimethyl(3-vinylphenylpropoxy)silane, ethoxymethylethyl(3-vinylphenylpropoxy)silane, ethoxymethylpropyl(3-vinylphenylpropoxy) silane, ethoxydiethyl(3-vinylphenylpropoxy)silane, ethoxyethylpropyl(3-vinylphenylpropoxy)silane, ethoxydipropyl(3-vinylphenylpropoxy)silane, etc.

As mentioned above, because the conjugated diene random copolymer according to the present invention contains an alkoxysilane functional group in the molecular structure thereof, compatibility with carbon black or silica used as a reinforcing agent becomes very high. Thus, when the conjugated diene random copolymer according to the present invention is used as a rubber material for a tire, it is enhanced in compatibility with the reinforcing agent such as carbon black or silica, thereby improving mechanical properties, dynamic properties, wear resistance and mixing processability.

Below is a description of a method of preparing the conjugated diene random copolymer according to the present invention.

The conjugated diene random copolymer according to the present invention is prepared via emulsion polymerization. Specifically, the conjugated diene random copolymer may be prepared by adding a monomer mixture comprising the conjugated diene monomer, the aromatic vinyl monomer, and at least one alkoxysilane monomer represented by Formula 1 or 2, with a surfactant, a radical initiator and a molecular weight controller, and performing radical emulsion polymerization.

More specifically, the conjugated diene random copolymer may be prepared in such a manner that the monomer mixture comprising 45~89.99 wt % of the conjugated diene monomer (e.g. a butadiene monomer), 10~50 wt % of the aromatic vinyl monomer (e.g. a styrene-based monomer), and 0.01~10 wt % of at least one alkoxysilane monomer represented by Formula 1 or 2 is subjected to radical emulsion polymerization by use of 0.1~5 parts by weight of a surfactant, 0.05~3 parts by weight of a radical initiator and 0.001~2 parts by weight of a molecular weight controller, based on 100 parts by weight of the monomer mixture. In the present invention, radical emulsion polymerization may be performed at 0~80° C. for 1~48 hr.

As the monomer used in emulsion polymerization according to the present invention, the conjugated diene monomer is an unsaturated hydrocarbon having 4 to 12 carbon atoms with 4 to 8 unsaturated bonds in a single molecule. Examples of the conjugated diene monomer may include 1,3-butadiene, halogenated butadiene (e.g. chlorobutadiene), isoprene, 2,3-dimethyl-1,3-butadiene, 1,3-pentadiene and octadiene. The vinyl aromatic monomer may include styrene, 2-methylstyrene, 3-methylstyrene, 4-methylstyrene, α-methylstyrene, 2,4-dimethylstyrene, 2,4-diisopropylstyrene, 4-tert-butylstyrene, divinylstyrene, tert-butoxystyrene, halogenated styrene (e.g. monochlorostyrene), vinylbenzyldimethylamine, (4-vinylbenzyl)dimethylaminoethyl ether, N,N-dimethylaminoethylstyrene, 2-tert-butylstyrene, 3-tert-butylstyrene, 4-tert-butylstyrene, vinylpyridine or mixtures of two or more thereof.

In the conjugated diene random copolymer according to the present invention, if the amount of the conjugated diene monomer is less than 45 wt %, elasticity and wear resistance may decrease. In contrast, if the amount thereof exceeds 89.99 wt %, mechanical properties including tensile properties may deteriorate. Hence, it is preferable that this monomer be used in the above range. Also, if the amount of the aromatic vinyl monomer is less than 10 wt %, mechanical properties including tensile properties may deteriorate. In contrast, if the amount thereof exceeds 50 wt %, elasticity and wear resistance may decrease. Also, if the amount of the alkoxysilane monomer is less than 0.01 wt %, rolling resistance or wear properties among mixing properties of rubber may not be improved. In contrast, if the amount thereof exceeds 10 wt %, the viscosity of the compound may increase drastically.

The monomer mixture is subjected to emulsion polymerization using a surfactant, a radical initiator and a molecular weight controller.

The surfactant may be anionic, cationic or nonionic. Preferably useful as the surfactant is any one or a mixture of two or more selected from among metal salts and ammonium salts. Specifically, used may be any one or a mixture of two or more selected from among rosin acid metal salts, fatty acid metal salts, alkylsulfate metal salts, alkylallylsulfonic acid metal salts, alkylphosphate metal salts, alkylsulfate ammonium salts, alkylallylsulfonic acid ammonium salts, alkylarylsulfonic acid ammonium salts, allylsulfonic acid ammonium salts and alkylphosphate ammonium salts. More preferably, the surfactant may include any one or a mixture of two or more selected from among rosin acid metal salts, fatty acid metal salts, dodecylbenzene sulfonic acid, lauryl sulfonic acid and hexadecyl sulfonic acid. As such, alkyl and aryl each contain 5 to 20 carbon atoms. If the number of carbon atoms is less than 5, a micelle may be undesirably formed. In contrast, if the number of carbon atoms exceeds 20, hydrophilicity may decrease. Hence, it is preferable that alkyl and aryl having the number of carbon atoms in the above range be used. The surfactant is used in an amount of 0.1~7 parts by weight based on 100 parts by weight of the monomer mixture. If the amount of the surfactant is less than 0.1 parts by weight, a micelle may not be formed. In contrast, if the amount thereof exceeds 7 parts by weight, a microemulsion may be formed, undesirably producing a polymer having a low molecular weight. Hence, it is preferable that this surfactant be used in the above amount range.

The radical initiator may include those typically useful in the art. Preferably, the radical initiator includes any one or a mixture of two or more selected from among persulfuric acid such as potassium persulfate or ammonium persulfate, acetyl acetone peroxide, benzyl peroxide, dicumyl peroxide, 2,4-dichlorobenzyl peroxide, tert-butyl peracetate, 2,2'-azobis (isobutylamidine)dihydrochloride, azobis isobutyronitrile peroxide, a redox system and a typical initiator system for emulsion polymerization. The radical initiator is used in an amount of 0.05~3 parts by weight based on 100 parts by weight of the monomer mixture. If the amount of the radical initiator is less than 0.05 parts by weight, polymerization does not occur sufficiently. In contrast, if the amount thereof exceeds 3 parts by weight, a polymer having a low molecular weight may be formed undesirably. Hence, it is preferable that the radical initiator be used in the above amount range.

The molecular weight controller may include a mercaptan-based molecular weight controller which is typically used upon preparation of a conjugated diene polymer. Preferably useful as the molecular weight controller is a thiol having 8 to 20 carbon atoms, and specific examples thereof may include any one or a mixture of two or more selected from among octanethiol, decanethiol, dodecanethiol and hexadecanethiol. The average molecular weight of the polymer may be controlled by adjusting the amount of the molecular weight controller. The molecular weight controller may be used in an amount of 0.001~2 parts by weight based on 100 parts by weight of the monomer mixture. For example, when the amount of the molecular weight controller falls in the range of 0.001~0.1 parts by weight, a conjugated diene polymer having a high molecular weight may be obtained. Also, when the amount of the molecular weight controller falls in the range of 0.5~2 parts by weight, a conjugated diene polymer having a low molecular weight may be obtained. If the amount of the molecular weight controller is less than 0.001 parts by weight, gelling may occur. In contrast, if the amount thereof exceeds 2 parts by weight, properties may deteriorate. Hence, it is preferable that the molecular weight controller be used in the above amount range.

The conjugated diene random copolymer resulting from emulsion polymerization has a weight average molecular weight of 100,000~2,000,000 g/mol. If the weight average molecular weight of the polymer is less than 100,000 g/mol, properties may deteriorate. In contrast, if the weight average molecular weight thereof exceeds 2,000,000 g/mol, the compound may be increased in viscosity and strength and is thus difficult to process.

The conjugated diene random copolymer resulting from emulsion polymerization has a Mooney viscosity [ML(1+4) @100° C.] of 20~200, and preferably 30~160.

Also, the conjugated diene random copolymer prepared via the above polymerization process was analyzed in terms of the microstructure of the polymer, the composition ratio of the conjugated diene monomer and the aromatic vinyl monomer, the random and block ratio of the diene monomer and the aromatic vinyl monomer, and introduction of alkoxysilane, by means of nuclear magnetic resonance (NMR) spectrum, IR spectrum, etc. Furthermore, molecular weight (MW) and molecular weight distribution were analyzed using gel permeation chromatography (GPC). The Mooney viscosity of rubber was analyzed using a Mooney viscometer, and rubber mixing was performed using a 500 cc lab mixer.

In addition, the present invention provides a polymer composition for a tire, including the conjugated diene random copolymer having the alkoxysilane unit and a reinforcing agent.

The reinforcing agent contained in the polymer composition according to the present invention may include carbon black, silica, etc., which are typically used in fields of manufacturing tires. Such an inorganic reinforcing agent may be used in an amount of 20~150 parts by weight, and preferably 70~120 parts by weight, based on 100 parts by weight of the conjugated diene random copolymer.

The polymer composition may further include a typical conjugated diene polymer, in addition to the conjugated diene random copolymer having the alkoxysilane unit. Such a typical conjugated diene polymer may be a homopolymer or copolymer of a diene monomer, or a copolymer of a diene monomer and an aromatic vinyl monomer. The typical conjugated diene polymer which is additionally contained may be used in an amount of less than 100 parts by weight, preferably 1~50 parts by weight, and more preferably 10~30 parts by weight, based on 100 parts by weight of the conjugated diene random copolymer having the alkoxysilane unit according to the present invention.

A better understanding of the present invention may be obtained via the following examples and test examples which are set forth to illustrate, but are not to be construed as limiting the present invention.

EXAMPLES

Preparation of Conjugated Diene Random Copolymer

Example 1

In a 5 L pressure reactor at 10° C., 1600 mL of water, 25 g of sodium rosinate, 35 g of fatty acid sodium, 480 g of styrene, 517 g of 1,3-butadiene, 3 g of (trimethoxysilyl)methyl methacrylate, 1.0 g of methane hydroperoxide, 0.5 g of EDTA, 0.1 g of ferrous sulfate, 0.5 g of sodium hydrosulfite, and 1.0 g of n-dodecylmercaptan were continuously placed, and stirred for 10 hr. The reaction was stopped by the addition of 1.0 g of diethylhydroxyamine. To remove unreacted monomers, stripping was carried out, and 20 g of a 20% sulfuric acid aqueous solution and 500 g of 25% sodium chloride were added for latex agglutination, thus obtaining a rubber aggregate (yield 60%).

Figure 1B:
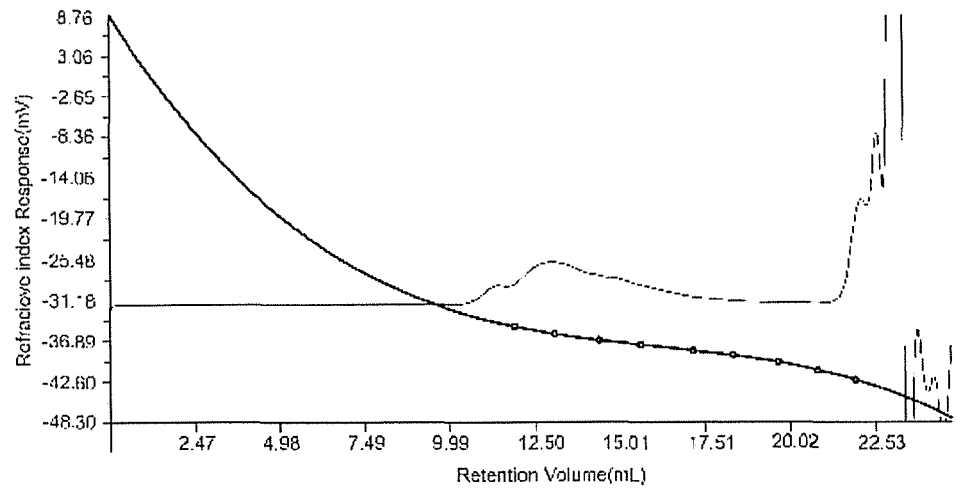
FIG. 1B illustrates gel permeation chromatogram of the conjugated diene random copolymer of Example 1.

The molecular weight of the obtained copolymer was determined to be 958,700 g/mol by gel permeation chromatography (GPC). NMR spectrum of the conjugated diene random copolymer having the alkoxysilane unit as prepared in Example 1 is illustrated in FIG. 1A, and a GPC molecular weight distribution curve thereof is shown in FIG. 1B.

Example 2

A conjugated diene random copolymer (yield 60%) was prepared using emulsion polymerization in the same manner as in Example 1, with the exception that 480 g of styrene, 517 g of 1,3-butadiene and 3 g of (dimethoxymethylsilyl)methyl acrylate were used as the monomers.

Figure 2A:
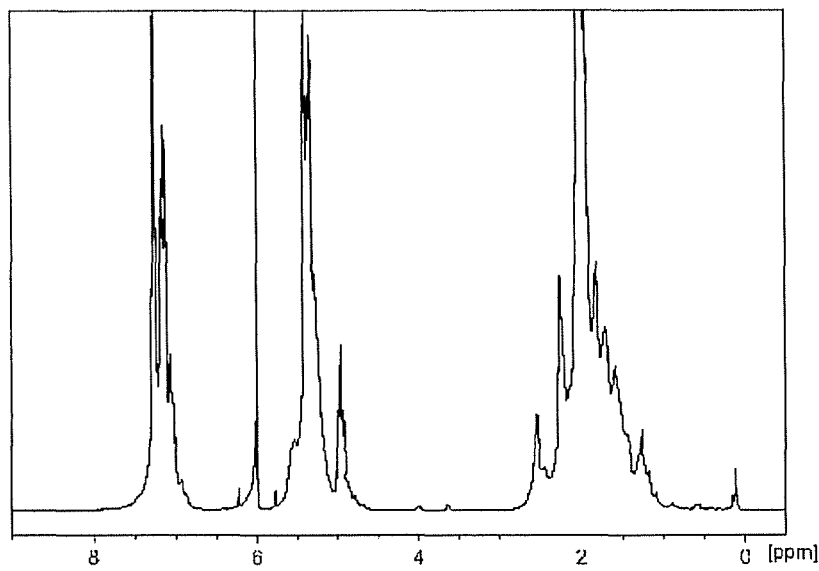
FIG. 2A illustrates $^1$H NMR spectrum of a conjugated diene random copolymer of Example 2.
Figure 2B:
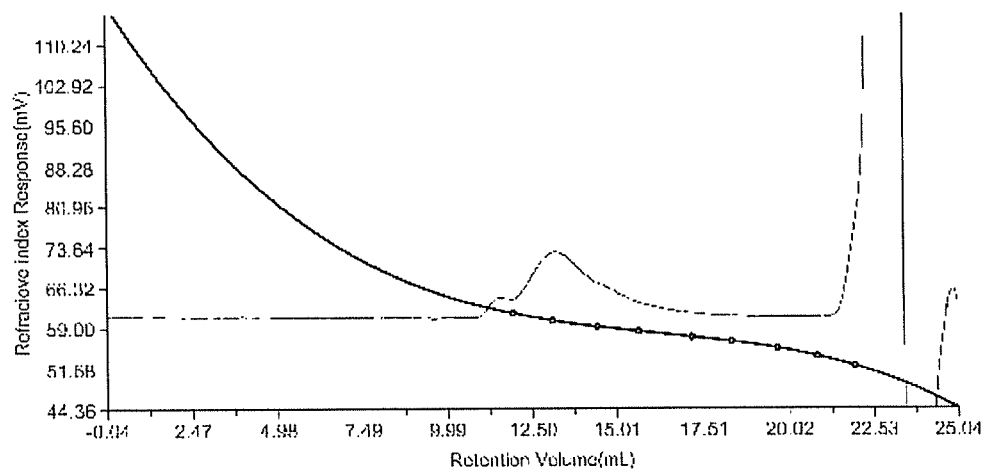
FIG. 2B illustrates gel permeation chromatogram of the conjugated diene random copolymer of Example 2.

The molecular weight of the obtained copolymer was determined to be 1,008,000 g/mol by GPC. NMR spectrum of the conjugated diene random copolymer having the alkoxysilane unit as prepared in Example 2 is illustrated in FIG. 2A, and a GPC molecular weight distribution curve thereof is shown in FIG. 2B.

Example 3

A conjugated diene random copolymer (yield 61%) was prepared using emulsion polymerization in the same manner as in Example 1, with the exception that 480 g of styrene, 517 g of 1,3-butadiene and 3 g of (diethoxymethylsilyl)propyl methacrylate were used as the monomers.

Figure 3A:
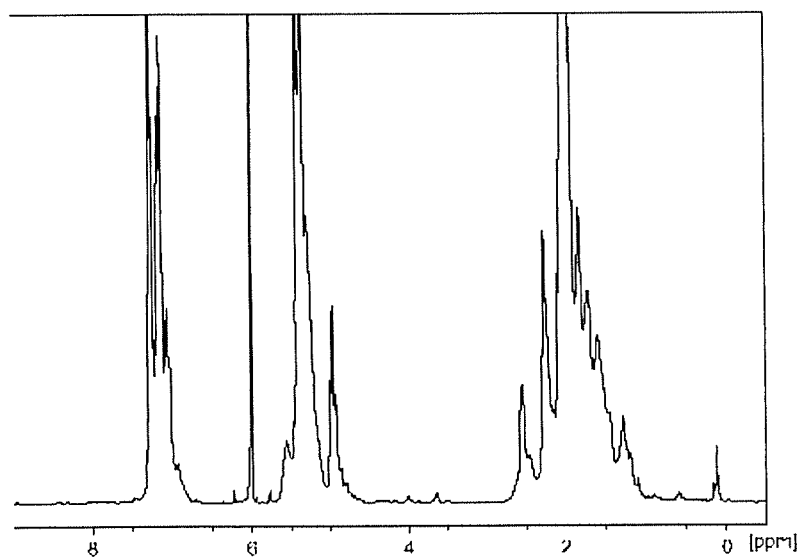
FIG. 3A illustrates $^1$H NMR spectrum of a conjugated diene random copolymer of Example 3.
Figure 3B:
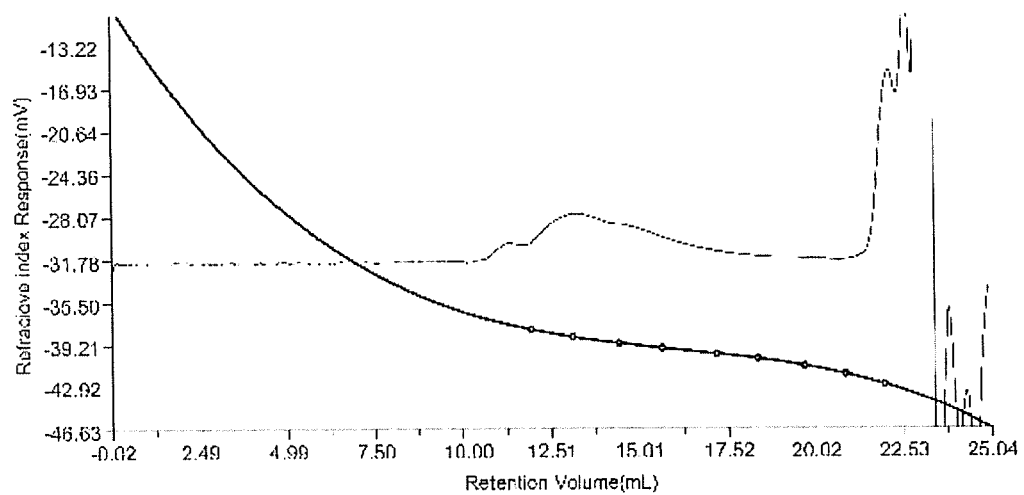
FIG. 3B illustrates gel permeation chromatogram of the conjugated diene random copolymer of Example 3.

The molecular weight of the obtained copolymer was determined to be 958,000 g/mol by GPC. NMR spectrum of the conjugated diene random copolymer having the alkoxysilane unit as prepared in Example 3 is illustrated in FIG. 3A, and a GPC molecular weight distribution curve thereof is shown in FIG. 3B.

Example 4

A conjugated diene random copolymer (yield 65%) was prepared using emulsion polymerization in the same manner as in Example 1, with the exception that 480 g of styrene, 517 g of 1,3-butadiene and 3 g of (methoxydiethylsilyl)propyl methacrylate were used as the monomers.

Figure 4A:
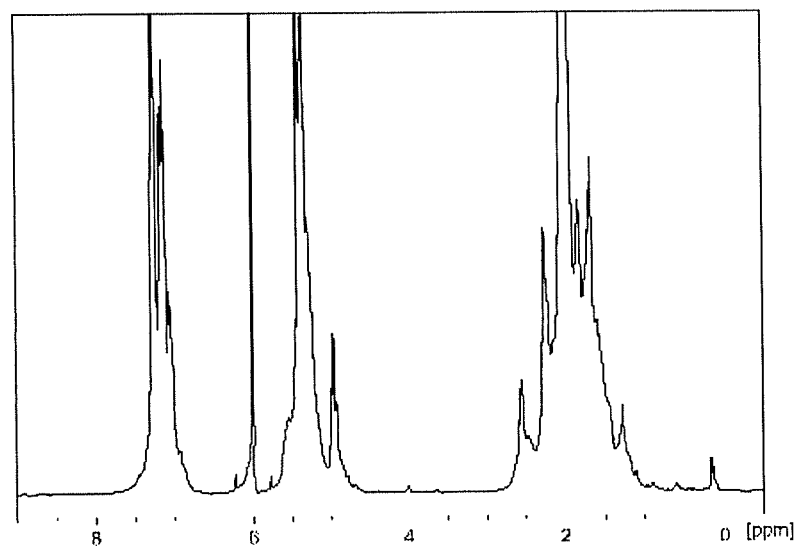
FIG. 4A illustrates $^1$H NMR spectrum of a conjugated diene random copolymer of Example 4.
Figure 4B:
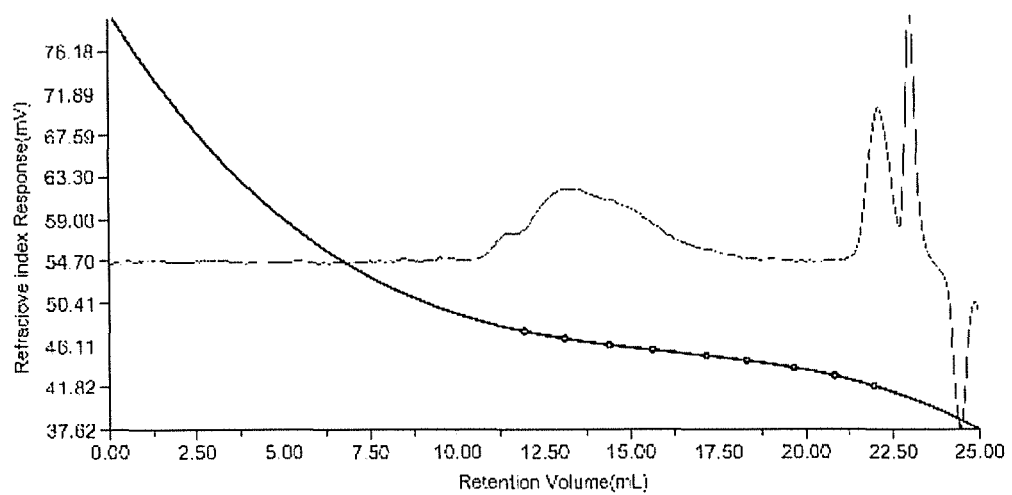
FIG. 4B illustrates gel permeation chromatogram of the conjugated diene random copolymer of Example 4.

The molecular weight of the obtained copolymer was determined to be 1,043,000 g/mol by GPC. NMR spectrum of the conjugated diene random copolymer having the alkoxysilane unit as prepared in Example 4 is illustrated in FIG. 4A, and a GPC molecular weight distribution curve thereof is shown in FIG. 4B.

Example 5

A conjugated diene random copolymer (yield 65%) was prepared using emulsion polymerization in the same manner as in Example 1, with the exception that 480 g of styrene, 517 g of 1,3-butadiene and 3 g of trimethoxy(4-vinylphenoxy) silane were used as the monomers.

Figure 5A:
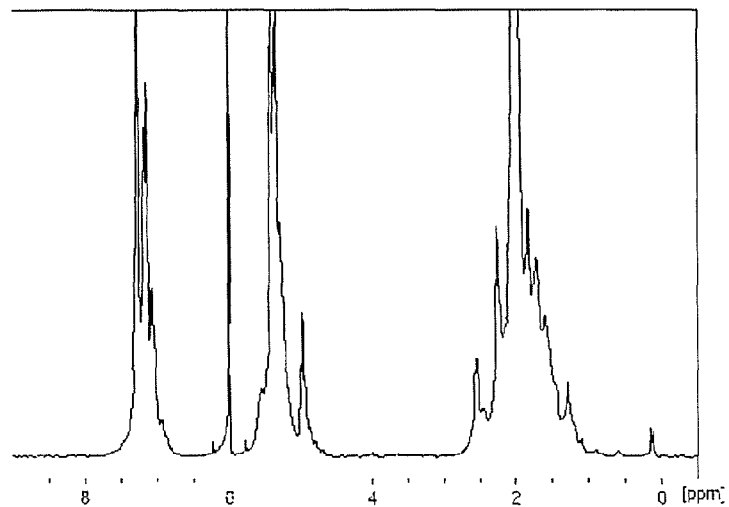
FIG. 5A illustrates $^1$H NMR spectrum of a conjugated diene random copolymer of Example 5.
Figure 5B:
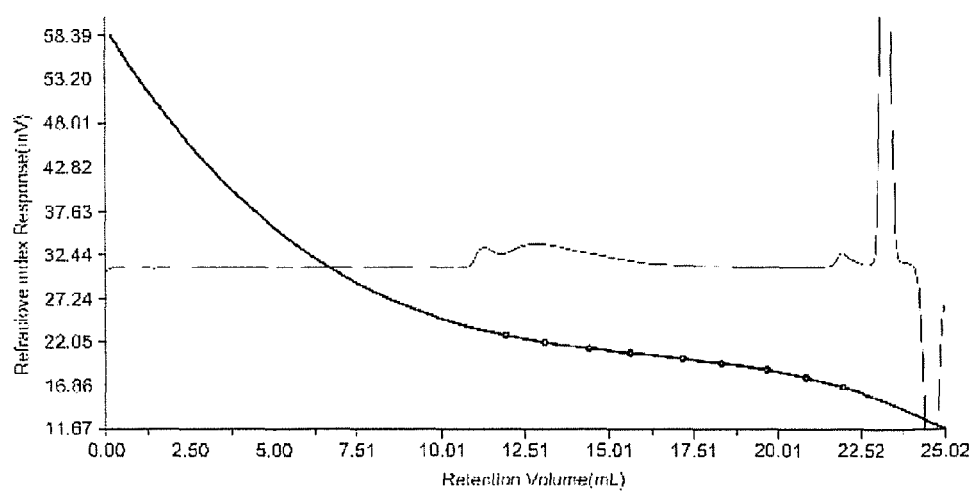
FIG. 5B illustrates gel permeation chromatogram of the conjugated diene random copolymer of Example 5.

The molecular weight of the obtained copolymer was determined to be 764,700 g/mol by GPC. NMR spectrum of the conjugated diene random copolymer having the alkoxysilane unit as prepared in Example 5 is illustrated in FIG. 5A, and a GPC molecular weight distribution curve thereof is shown in FIG. 5B.

Comparative Example 1

A conjugated diene random copolymer (yield 62%) was prepared using emulsion polymerization in the same manner as in Example 1, with the exception that 480 g of styrene and 520 g of 1,3-butadiene were used as the monomers, and the alkoxysilane monomer was not added.

Figure 6A:
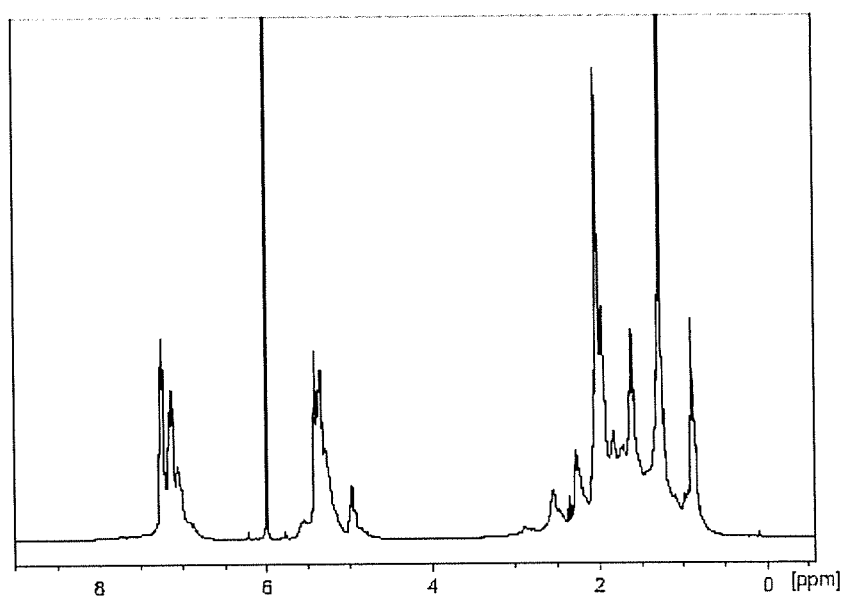
FIG. 6A illustrates $^1$H NMR spectrum of a conjugated diene random copolymer of Comparative Example 1.
Figure 6B:
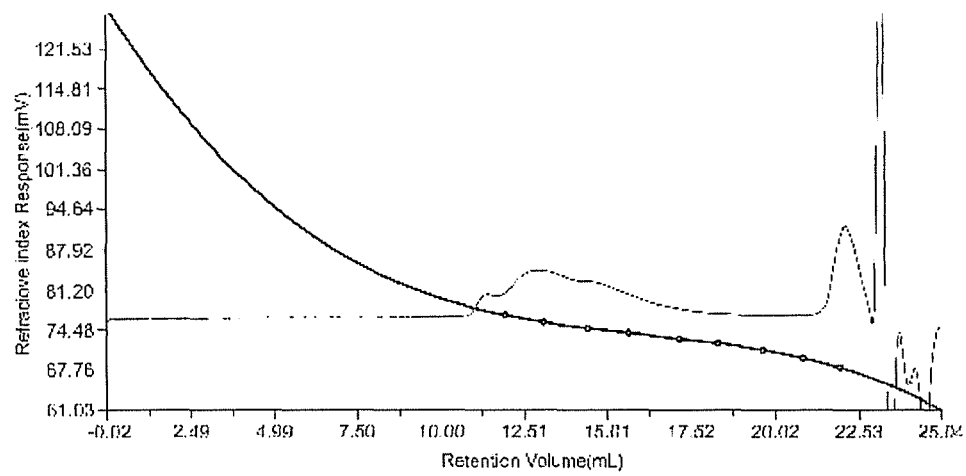
FIG. 6B illustrates gel permeation chromatogram of the conjugated diene random copolymer of Comparative Example 1.

The molecular weight of the obtained copolymer was determined to be 979,100 g/mol by GPC. NMR spectrum of the styrene-butadiene copolymer of Comparative Example 1 is illustrated in FIG. 6A, and a GPC molecular weight distribution curve thereof is shown in FIG. 6B.

Comparative Example 2

A conjugated diene random copolymer (yield 61%) was prepared using emulsion polymerization in the same manner as in Example 1, with the exception that 480 g of styrene, 490 g of 1,3-butadiene and 30 g of hydroxypropyl methacrylate were used as the monomers.

Figure 7A:
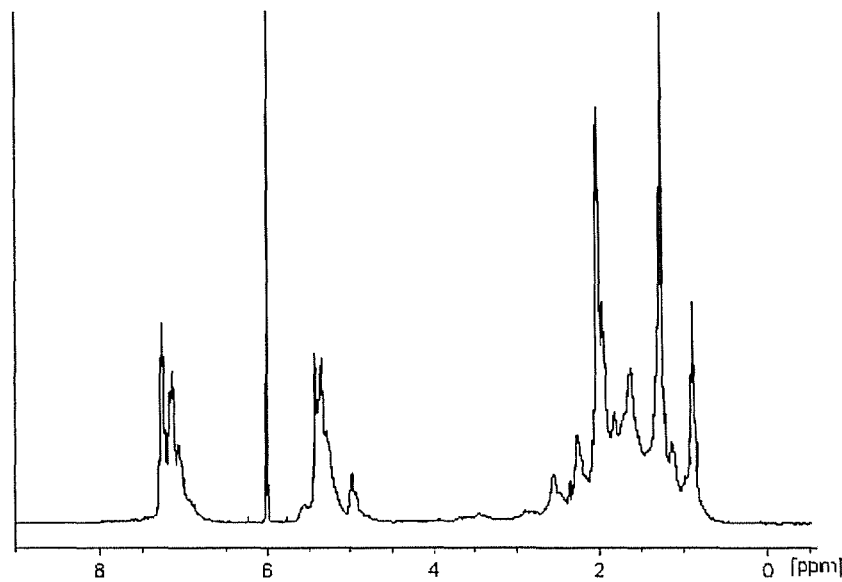
FIG. 7A illustrates $^1$H NMR spectrum of a conjugated diene random copolymer of Comparative Example 2.
Figure 7B:
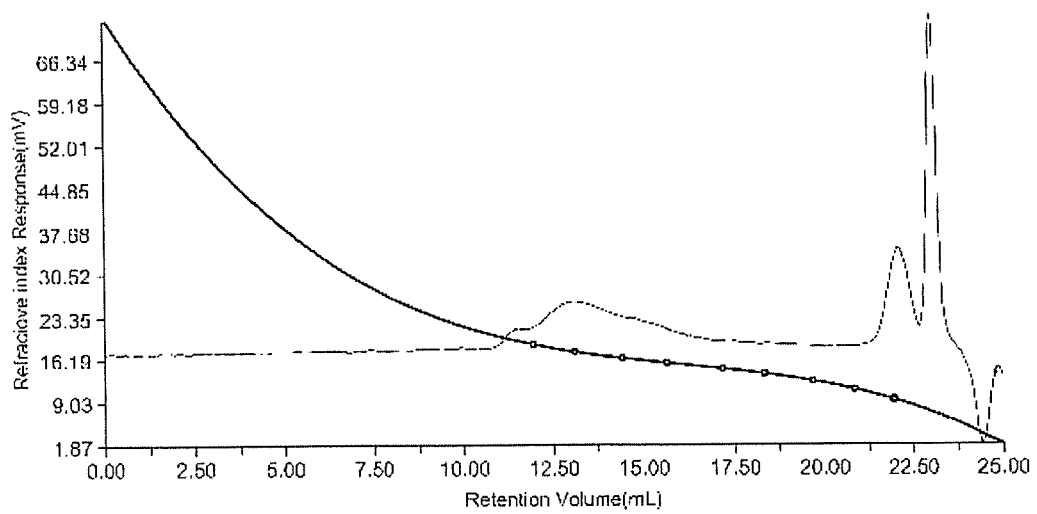
FIG. 7B illustrates gel permeation chromatogram of the conjugated diene random copolymer of Comparative Example 2.

The molecular weight of the obtained copolymer was determined to be 1,129,000 g/mol by GPC. NMR spectrum of the styrene-butadiene copolymer of Comparative Example 2 is illustrated in FIG. 7A, and a GPC molecular weight distribution curve thereof is shown in FIG. 7B.

In the above examples and comparative examples, the conjugated diene random copolymers prepared by emulsion polymerization with additional use of at least one alkoxysilane monomer represented by Formula 1 or 2 as proposed by the present invention were maintained at high yield thanks to the formation of a stable emulsion, and it was easy to adjust the molecular weight of the copolymers.

Test Examples

Preparation Examples 1 to 5 and Comparative Preparation Examples 1 and 2

Formation of Tire Tread Sample

In a closed-type mixer (Banbury mixer), 80 g of the copolymer of each of Examples 1 to 5 and Comparative Examples 1 and 2, 20 g of polybutadiene rubber (KBR-01, available from Kumho Petrochemical), 37.5 g of process oil, 3 g of zinc oxide, 2 g of stearic acid, 80 g of silica (Ultrasil 7000GR), 6.4 g of 3-triethoxysilylpropyl tetrasulfide (Si69), and 1 g of N-(1,3-dimethyl)-N'-phenyl-p-phenylenediamine (6-PPD) as an antioxidant were sequentially placed. Subsequently, primary mixing was performed via kneading for 10 min under conditions of 60° C. and 60 rpm to obtain a first mixture, and then the processing temperature was lowered to 50° C., after which the first mixture was mixed with 2.2 g of sulfur, and 2.8 g of N-cyclohexyl-2-benzothiazyl sulfonamide as a vulcanizing accelerator with stirring at 60° C. at 50 rpm for 3 min, thus obtaining a second mixture. The second mixture was then processed into a flat sheet using a roll having a thickness of 1.2 mm and then allowed to stand for 24 hr. The vulcanization process was carried out via pressing using a hot press at 160° C. under a pressure of 160 kgf/cm$^2$ or more for 10 min, thus manufacturing a 2 mm thick sheet as a sample for measurement of properties.

The properties of the samples of Preparation Examples 1 to 5 and Comparative Preparation Examples 1 and 2 were measured and compared. The results are shown in Table 1 below.

The properties were measured in terms of tensile strength by ASTM D412, wear resistance by DIN method, and wet traction by hysteresis (Tan δ) method. The traction properties are represented by Tan θ at 0° C., and are known to be superior in proportion to an increase in this Tan value. Also, rolling resistance is represented by Tan δ at 60° C., and is known to be superior in proportion to a decrease in this Tan value. The results are given in Table 1 below.

TABLE 1

| | | Prep. Ex. | | | | | Comp. Prep. Ex. | |
|---|---|---|---|---|---|---|---|---|
| | | 1 | 2 | 3 | 4 | 5 | 1 | 2 |
| | Raw MV (ML 1 + 4 at 100° C.) | 53 | 51 | 52 | 50 | 51 | 54 | 47 |
| | Compound Mooney Viscosity (ML 1 + 4 at 100° C.) | 120 | 110 | 108 | 88 | 87 | 76 | 132 |
| TENSILE | Shore hardness (shore A) | 69 | 68 | 68 | 64 | 66 | 66 | 66 |
| | 300% modulus (kgf/cm$^2$) | 140 | 136 | 135 | 129 | 133 | 133 | 112 |
| | Tensile strength (kgf/cm$^2$) | 220 | 235 | 235 | 228 | 220 | 177 | 185 |
| | Elongation (%) | 450 | 475 | 480 | 487 | 480 | 373 | 383 |
| GABO | Tg (° C.) | −18.0 | −17.5 | −17.3 | −16.0 | −16.5 | −17.0 | −16.7 |
| | Tanδ at Tg | 0.6912 | 0.6996 | 0.7001 | 0.7049 | 0.7010 | 0.6287 | 0.6886 |
| | Tanδ at 0° C. | 0.396 | 0.4048 | 0.4081 | 0.4120 | 0.4092 | 0.352 | 0.355 |

TABLE 1-continued

|  |  | Prep. Ex. | | | | | Comp. Prep. Ex. | |
| --- | --- | --- | --- | --- | --- | --- | --- | --- |
|  |  | 1 | 2 | 3 | 4 | 5 | 1 | 2 |
|  | (Increment a) | (113%) | (115%) | (116%) | (117%) | (116%) | (100%) | (101%) |
|  | Tanδ at 60° C. | 0.085 | 0.083 | 0.082 | 0.080 | 0.083 | 0.112 | 0.116 |
|  | (Increment b) | (132%) | (135%) | (137%) | (140%) | (135%) | (100%) | (97%) |
| DIN | Wear loss (g) | 0.1560 | 0.1550 | 0.1549 | 0.1500 | 0.1560 | 0.2215 | 0.2170 |
|  | (Increment c) | (142%) | (143%) | (143%) | (148%) | (142%) | (100%) | (102%) | a), b), c) increment: the degree of increase in each of wet traction (Tanδ at 0° C.), rolling resistance (Tanδ at 70° C.) and wear resistance of individual samples based on the sample of Comparative Preparation Example 1 is converted into a percentage As is apparent from Table 1, the tire tread samples containing the conjugated diene random copolymers according to the present invention exhibited excellent properties because wet traction (Tan θ at 0° C.), rolling resistance (Tan θ at 60° C.) and wear resistance were uniformly improved while maximizing silica affinity.

Therefore, the composition containing the conjugated diene random copolymer according to the present invention may be utilized as a material for a variety of products including shoes, belts, etc., as well as tires.

As described hereinbefore, the present invention provides a conjugated diene random copolymer having an alkoxysilane unit. According to the present invention, because the conjugated diene random copolymer contains an alkoxysilane unit having a specific structure in the molecular structure thereof, it is enhanced in affinity to a reinforcing material such as carbon black or silica, and is thus effective at increasing the degree of dispersion when mixed with the reinforcing material.

According to the present invention, the conjugated diene random copolymer has high miscibility with a reinforcing agent, and thus can be utilized as a tire material and is effective at improving properties including low rolling resistance, which can directly affect the tire's fuel efficiency, and also at improving dynamic properties including high wet resistance, which can affect braking properties. Furthermore, tensile properties which show rigidity of the tire can be enhanced and tire wear can be improved.

Therefore, the conjugated diene random copolymer having the alkoxysilane unit according to the present invention is useful as a tire material having low fuel consumption and high performance.

Also, the conjugated diene random copolymer having the alkoxysilane unit according to the present invention is employed as a rubber material for shoes or belts because of superior properties including hardness, strength, elongation, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A conjugated diene random copolymer having an alkoxysilane unit, prepared by subjecting a conjugated diene monomer, an aromatic vinyl monomer, and an alkoxysilane monomer represented by Formula 2 below to emulsion polymerization:

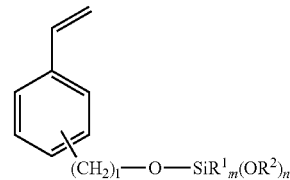

[Formula 2]

in Formula 2, R1 and R2 are identical to or different from each other and are a C1-C10 alkyl group, l is an integer of 0-30, and n is an integer of 1-3, with a proviso that m+n=3.

2. The conjugated diene random copolymer of claim 1, wherein R1 and R2 are identical to or different from each other and are C1-C6 alkyl group, l is an integer of 0-6, and n is an integer of 1-3, with a proviso that m+n=3.

3. The conjugated diene random copolymer of claim 1, which is prepared by subjecting 45-89.99 wt % of the conjugated diene monomer, 10 50 wt % of the aromatic vinyl monomer, and 0.01-10 wt % of the at least one alkoxysilane monomer represented by Formula 2 to emulsion polymerization.

4. A polymer composition, comprising:
the conjugated diene random copolymer of claim 1; and
a reinforcing agent.

5. The polymer composition of claim 4, further comprising a conjugated diene copolymer, wherein the conjugated diene copolymer is selected from the group consisting of a homopolymer of a diene monomer; a copolymer of a diene monomer; and a copolymer of a diene monomer and an aromatic vinyl monomer.

6. The polymer composition of claim 4, wherein the reinforcing agent is selected from the group consisting of carbon black and silica.

7. The polymer composition of claim 4, comprising:
100 parts by weight of the conjugated diene random copolymer; and
20-150 parts by weight of an inorganic reinforcing agent.

8. A tire, formed from the polymer composition of claim 4.

* * * * *